United States Patent [19]

Tustison et al.

[11] Patent Number: 5,120,602
[45] Date of Patent: Jun. 9, 1992

[54] OPTICAL ELEMENTS AND METHOD OF MANUFACTURE

[75] Inventors: Randal W. Tustison, Lexington; Dennis G. Montanari, Townsend, both of Mass.

[73] Assignee: Raytheon Company, Lexington, Mass.

[21] Appl. No.: 474,424

[22] Filed: Feb. 2, 1990

[51] Int. Cl.$^5$ .............................................. B32B 9/00
[52] U.S. Cl. ................................. 428/336; 428/697; 428/699; 428/704; 359/350; 359/356
[58] Field of Search ................. 350/1.1, 1.6, 164, 165, 350/166, 1.4, 1.5; 428/704, 697, 699, 336

[56] References Cited

U.S. PATENT DOCUMENTS

| | | | |
|---|---|---|---|
| 2,758,510 | 8/1956 | Auwarter | 350/1.6 |
| 3,432,225 | 3/1969 | Rock | 350/1.7 |
| 4,209,229 | 6/1980 | Rittler | 350/96.34 |
| 4,461,750 | 7/1984 | Chess et al. | 423/263 |
| 4,476,156 | 10/1984 | Brinker et al. | 427/82 |
| 4,498,728 | 2/1985 | Thoni et al. | 350/1.7 |
| 4,708,419 | 11/1987 | Scherber et al. | 350/319 |
| 4,770,479 | 9/1988 | Tustison | 350/1.6 |

FOREIGN PATENT DOCUMENTS

0049032A1 of 0000 European Pat. Off. .
2105371B of 0000 United Kingdom .
2165266A of 0000 United Kingdom .

OTHER PUBLICATIONS

Frances M. Lussier; Guide to IR-Transmissive Material; Dec. 1976; Vol. #12; pp. 47-50.
Bar & Stroud Spec. Sheet, No. ARZ5, "Advance Technical Data". (Date Unknown).
B. Hodgson, et al. A Reprint from the Proceedings, "Diamond Turning of IR Components", SPIE, vol. 590, Infrared Technology and Applications (1985), pp. 71-76.
Table III. "Oxide Films for Optical Applications", Applied Optics, vol. 18, No. 12, Jun. 15, 1979, pp. 1972-1973.
J. E. Field, et al. Appendix, "Liquid Impact Damage Assessment or a Range of Infra-red Materials", pp. 21-1 through 21-13.
S. Van Der Zwaag, et al., "The Effect of Double Layer Coatings of High Modulus on Contact Stresses", Philosophical Magazine A, 1986, vol. 53, No. 1, pp. 101-111.
"Plasma assisted ion plating deposition of optical thin films for coatings and integrated optical applications", M. Varasi, C. Mancini, P. Sartori, C. Misiano, Vacuum Vol. 36 Nos. 1-3, pp. 143-147, 1986.
"Compressive Thin Films for Increased Fracture Toughness", P. H. Kobrin and A. B. Harker, Rockwell International Science Center, pp. 5-9.
"Impact Damage Thresholds in Brittle Materials Impacted by Water Drops", A. G. Evans, V. M. Ito, and M. Rosenblatt, 1980 American Institute of Physics, J. Appl. Phys. 51(5) May 1980.
Herstellung Und Eigenschaften Von Schichten Aus Y203 Und Oxiden Der Seltenen Erden Auf Glas*, B. Frank Und R.Groth Thin Solid Films, 3(1969) 41-50--Elsevier, Lausanne.
"Antisolar and Thermally Insulating Thin Films for Simple Glazings", D. Gross, Elsevier Sequoia, Sep. 18-20, 1980, Thin Solid Films 77 (1981) 128.

(List continued on next page.)

Primary Examiner—Patrick J. Ryan
Attorney, Agent, or Firm—Denis G. Maloney; Richard M. Sharkansky

[57] ABSTRACT

An optical element includes a base layer of a first material selected from the group consisting of gallium arsenide, gallium phosphide, cadmium telluride, mercury cadmium telluride, zinc sulfide and zinc selenide, and a coating layer of the selected base layer material. The coating layer has a predetermined degree of intrinsic compressive stress to protect the base layer.

13 Claims, 4 Drawing Sheets

OTHER PUBLICATIONS

"Oxide Coatings from the Sol-Gel Process", Lisa C. Klein, Rutgers University Ceramics Dept., Box 909 Piscataway, N.J. 08854, pp. 378-385.

"Liquid Jet Impact Damage on Zinc Sulphide", S. Van Der Zwag, J. E. Field, Dept. of Metallurgy, Journal of Material Science Jan. (1982) 2525-2636.

"Growth of Diamond at Room Temperature by an Ion-Beam Sputter Deposition Under Hydrogen-ion Bombardment", Makoto Kitabatake and Kiyotaka Wasa, Central Research Laboratories, J. Appl. Phys. 58(4) Aug. 15, 1985.

"Structure and Properties of Quasi-Amorphous Films Prepared by Ion Beam Techniques", C. Weissmentel, K. Bewiloqua, D. Dietrich, H.—J. Erler, H.—J. Hinneberg, S. Klose, W. Nowick, and G. Reisse, Conference on Metallurgical Coatings (1980)19-31.

S. Van der Zwaag and F. E. Field, AFWAL-TR-8-2-4022.

J. E. Field, S. Van der Zwagg, D. Townsend and J. P. Dear, AFWAL-TR-83-4101.

"Amorphous and Crystalline Dip Coatings Obtained from Organometallic Solutions: Procedures, Chemical Processes and Products", Dislich, H. et al., Thin Solid Films 77 (1981) 129-139.

"Guide to IR-Transmissive Materials", F. Lussier, Laser Focus, vol. 12, No. 12, Dec., 1976, pp. 47-50.

OPTICAL ELEMENTS AND METHOD OF MANUFACTURE

BACKGROUND OF THE INVENTION

This invention relates generally to optical elements and more particularly to coatings which protect and strengthen IR optical elements.

As is known in the art, optical imaging systems generally include an optical element which shields the remainder of the imaging system from a hostile environment. For example, with infrared (IR) airborne imaging systems, an IR transparent optical element, such as window or dome, is mounted on the airborne system to isolate the remainder of the IR imaging system from exposure to humid, corrosive, abrasive, and high temperature environments. Prolonged exposure to these environments generally degrades the optical and physical characteristics of the material of the optical element. For many applications involving low speed missiles, low velocity water droplet impact is generally the most severe environmental exposure. However for newer hypersonic missile applications, aerothermodynamic loading of the optical element is the most severe environmental exposure since it can lead to catastrophic failure.

Failure of the element, whether the result of water droplet impact or aerothermodynamic loading, results from the environment interaction with the surface of the external element producing subsurface fractures, even at subsonic velocities. For very brittle materials these subsurface fractures are initiated at pre-existent microflaws, the so-called "Griffin flaw," lying near the surface of the optical element. Damage to such optical elements occurs prior to any significant removal of material. The mere propagation of these pre-existent microflaws is sufficient to damage the optical element. In particular, these microflaws are propagated through the optical element by the tensile component of the surface stresswave created at the time of impact with the water droplet or excess aerothermodynamic loading. Once formed, the continued propagation of the subsurface fractures through the optical element will often produce large cracks in the optical element. In the region of the crack, scattering and refraction of incident IR energy occurs producing increased internal reflections and IR energy losses. With a significant number of such cracks, the transmissivity of the optical element is severely reduced. Furthermore, as cracks propagate through the optical element, catastrophic failure of the element will occur. When the optical element shatters or breaks, the remaining optical elements of the IR imaging system are exposed to the external environment, resulting in potential catastrophic damage to the imaging system.

Typically, materials which offer the best mechanical durability and optical performance for infrared imaging systems in the 8 $\mu$m to 12 $\mu$m infrared band, are limited to a relatively small number. Suitable materials include zinc sulfide, zinc selenide, germanium, gallium arsenide, gallium phosphide, mercury cadmium telluride and cadmium telluride. Ternary sulfide materials such as calcium lanthanum sulfide are also currently being developed for IR applications, particularly in the 8–12 $\mu$m band. These ternary sulfide materials may provide some improvement in durability but even these materials are susceptible to the environmental exposures mentioned above. Generally, all of the aforementioned materials are relatively brittle and soft, and have low flexural strength, leading to low thermal shock resistance and resistance to damage, sustained during high velocity water droplet impact.

With the possible exception of polycrystalline diamond, which theoretically can provide an optical element having high strength and high transmittance, the best compromise materials currently available are zinc selenide (ZnSe) and zinc sulfide (ZnS) with ZnS being the more durable and ZnSe being the more transparent of the two. However, both materials are relatively soft and weak compared to materials used at midrange infrared wavelengths (i.e. 3 $\mu$m–5 $\mu$m).

It is also known that certain grades of zinc sulfide have extended optical transmittance ranges. For example, RAYTRAN®, Multispectral Grade® ZnS from Raytheon Company is transmissive in the visible portion of the wavelength range. It, however, also has hardness and strength characteristics which are lower than standard RAYTRAN® zinc sulfide.

Accordingly, a technique which can strengthen and harden such 8 $\mu$m–12 $\mu$m materials, particularly zinc selenide and zinc sulfide without affecting optical properties in any significant manner would be highly desired.

It is known in the art that high modulus coatings, such as a layer of hard carbon having quasi-diamond bonds and substantial optical transparency, when provided over germanium provides limited protection to germanium optical elements from impact damage caused by rain erosion and abrasion. Hard carbon coatings on germanium are described in an article entitled "Liquid Impact Erosion Mechanisms In Transparent Materials" by J. E. Fields et al., Final Report Sept. 30, 1982 to Mar. 31, 1983, Contract No. AFOSR-78-3705-D, Report No. AFWAL-TR-83-4101. The hard carbon surfaces have not successfully adhered directly to other IR materials such as zinc sulfide and zinc selenide. Furthermore, hard carbon coatings even on germanium as mentioned in the article are susceptible to debonding during high velocity water droplet impact. A further problem with hard carbon is that the index of refraction of hard carbon is about 2.45, which is substantially higher than the index refraction of many of the aforementioned optical materials, such as zinc sulfide and zinc selenide. Accordingly, if an optical element is coated with a hard carbon coating, reflection losses at the incident surface of the optical element will be higher than if the optical element was not coated.

As also mentioned, most materials which are suitable for IR transparent windows, particularly in the 8 $\mu$m–12 $\mu$m band have low flexural strengths. This characteristic is particularly important in high aerothermodynamic applications of these elements where the element is under some static or dynamic mechanical load. In an article entitled "Direct Synthetic/Fabrication and Surface Modification of IR Window Materials For the 8–14 Micron Range," Annual Report No. 1, period Mar. 1, 1985–Feb. 28, 1986, Contract No. N00014-85-C-0140, Task II, Korbin et al pgs 5 - 7, the authors describe their work in which single compressive layers of $Si_3N_4$, $Al_2O_3$, and AlN were deposited over a glass base by reactive ion beam deposition. Their measurements indicate that the deposited material had an intrinsic compressive stress. Their attempts to extend the work to LWIR materials, such as ZnS were futile. In another article entitled "Impact Damage Threshold in Brittle Materials Impacted by Water Drops" by A. G. Evans et al., Journal of Applied Physics 51 (5), pps. 2473-2482 (May, 1980) at page 2481, it was theorized that martensite toughening (phase changes) at the surface of the brittle material may be useful in tempering such brittle materials. It was also theorized that surface compression stresses could be of benefit. However, the authors gave no specific description what they meant by "surface compression." These brittle materials undergo surface compression when incident water drops impact the surface of the material.

SUMMARY OF THE INVENTION

In accordance with the present invention, an optical element includes a base layer of a first material selected from the group consisting of gallium arsenide, gallium phosphide, cadmium telluride, mercury cadmium telluride, zinc sulfide and zinc selenide, and a coating layer of the selected base layer material having an intrinsic compressive stress. The grain profile of such an element will have a first portion of relatively large grains in a uniform pattern. This grain structure is abruptly terminated at an interface with the coating in a region of highly disordered grain boundary mismatch. The grain structure of the coating will be relatively small compared to that of the base. With such an arrangement, the coating layer having an intrinsic compressive stress compensates for the so-called Griffin flaw or crack resident at the surface of the optical element. The coating thus effectively incorporates the crack into the bulk of the material and provides a concomitant increase in flexural strength. Moreover, the presence of the compressive layer also provides a threshold which tensile forces must overcome to cause failure of the element. The coating will protect droplet impact. Furthermore, the coating being the same material as the base has a high resistance to debonding from sheering forces, and thus will remain intact on the optical element during high velocity water droplet impact, as well as during aerothermodynamic loading.

In accordance with a further aspect of the present invention, an optical element transparent over at least the 8 $\mu$m-12 $\mu$m wavelength band includes a base layer, with the material of the base layer selected from the group consisting of zinc sulfide and zinc selenide, and a coating layer, with the material of the coating being the selected one of zinc sulfide, and zinc selenide having an intrinsic compressive stress of $10^8$ to $10^{10}$ dynes/cm$^2$ preferrable $6.5 \times 10^9$ to $8.5 \times 10^9$ dynes/cm$^2$. With such an arrangement, the coating provides an increase in the flexural strength and hardness of the element. The optical properties of the element will be unaffected since the coating, although mechanically under a compressive stress, is optically and chemically the same as the material of the base.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENT

Figure 1:
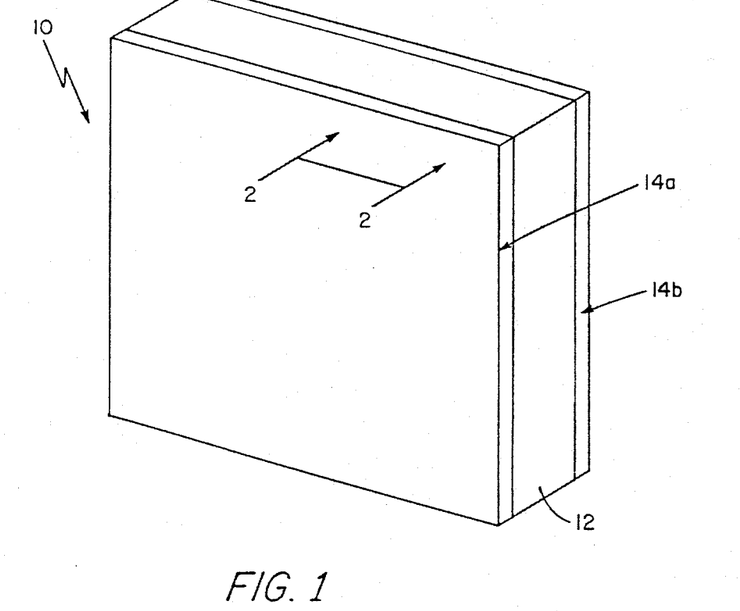
FIG. 1 is an isometric view of an optical element, here a plate comprising a base layer and a protective coating in accordance with the present invention.

Referring now to FIG. 1, an optical element here a plate 10 is shown to include a base layer 12 comprising a material having predetermined optical properties. Although the optical element is herein described in particular as being a plate, it is understood that other types of optical elements such as windows, domes, lenses, etc. having shapes other than planar may alternatively be substituted for the aforementioned plate 10. Typically base layer 12 will have a thickness of at least 0.05 in. generally 0.1 in. to about 0.5 in. or thicker. The optical element further may have selective optical properties. For example, the optical element may be comprised of a material which is transparent to optical energy generally in the infrared, visible, and/or ultraviolet spectrums. The material may be a dielectric or a semiconductor material.

In particular, for optical elements used in infrared imaging systems in the 8 $\mu$m to 12 $\mu$m wavelength range, examples of preferred materials include gallium arsenide, gallium phosphide, mercury cadmium telluride, cadmium telluride, zinc sulfide, zinc selenide, or one of the ternary sulfides. The selected material comprising layer 12 may be fabricated by any known technique such as powder compaction and densification or chemical vapor deposition. In particular for infrared applications, the material selected for layer 12 is generally characterized as having a relatively low modulus of elasticity typically in the range of $5 \times 10^6$ psi to $15 \times 10^6$ psi, a high transmittance to infrared energy, typically in a range of 50% to 75% over at least a portion of the infrared wavelength band of 2.0 $\mu$m to 30 $\mu$m, and an index of refraction at 10 microns typically in the range of 2.2 to 4.0. The relevant mechanical and optical properties of some of these materials are shown in Table 1.

TABLE 1

| Properties of Materials for Base Layer 12 | | | |
|---|---|---|---|
| Material | n @ 10 $\mu$m | Thermal Expansion Coefficient ($10^{-6}$/°C.) | Elasticity Modulus of X ($10^6$ psi) |
| CdTe | 2.6 | 5.9 | 5.0 |
| ZnSe | 2.4 | 7.7 | 9.7 |
| ZnS | 2.2 | 7.4 | 10.8 |
| CaLa$_2$S$_4$ | 2.4 | 14.7 | 13.8 |
| GaP | 3.0 | 5.3 | 20.6 |
| GaAs | 3.3 | 5.7 | 15.5 |

Figure 2:
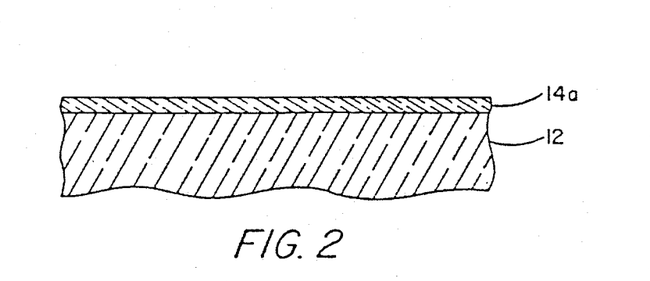
FIG. 2 is an exploded cross-sectional view taken along line 2—2 of FIG. 1 showing the protective coating in accordance with the present invention.
Figure 2A:
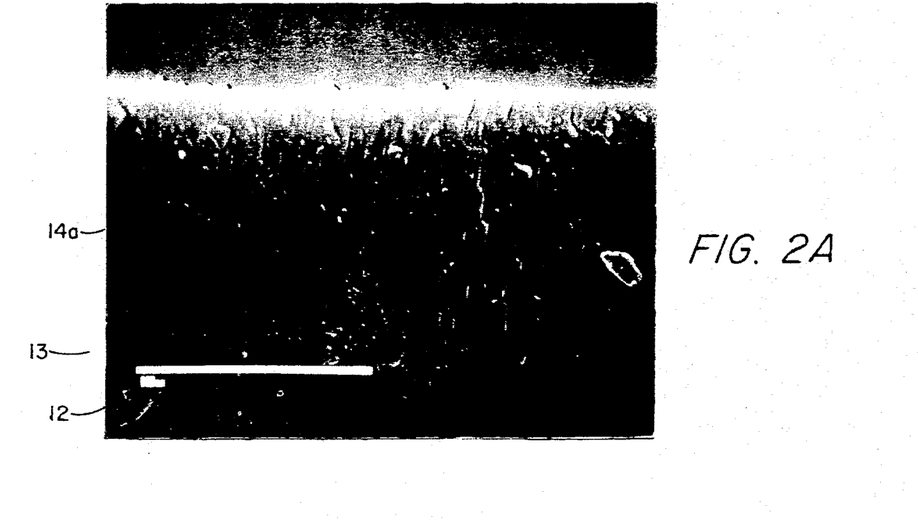
FIG. 2A is a photomicrograph of the typical grain structure of an optical element including a base of bulk material and a coating layer in accordance with the present invention.

The selected material being provided by a single know bulk fabrication process will have a uniform, relatively large grain structure as shown in FIG. 2A.

Disposed over base 12 are here a pair of protective coating layers 14a, 14b, which provide a relatively high degree of protection to such element from impact erosion and high aerothermodynamic environments. It is to be understood that while the optical element 10 is shown with two layers 14a, 14b over major surfaces of the base 12, for some applications only one layer would be necessary, whereas for other applications all surfaces may be coated with the protective layer coatings.

Referring now to FIG. 2, coating layer 14a is shown disposed over and preferably on the material comprising base 12. Coating layer 14a is the same material as the material of the base 12 and is deposited to a typical thickness in the range of 1 μm–8 μm. Thicker coatings up to 25 μm and thicker may alternatively be provided and will provide a concomitant increase in flexural strength and rain erosion resistance. Nevertheless, layer 14a is deposited to a mininum thickness to provide a continuous layer free of voids. Since the material of layer 14a is the same as that of base 12, layer 14a has an index of refraction and thermal expansion coefficients which are substantially equal to that of the material of base layer 12. In particular, the material of layer 14a will have a high degree of adherence to the material of base 12.

Layer 14a is deposited by any technique which deposits such layer with a relatively high intrinsic compressive stress compared to that of the base. Sputtering techniques including ion beam sputtering and diode sputtering, or as will be described r.f. magnetron sputtering are here used to provide the coating layer 14a as will be described. Coating 14b (FIG. 1) would be provided by similar techniques. Thus, since layers 14a and 14b are each of the same material as that of the base and are provided on the base with an intrinsic compressive stress characteristic, layers 14a and 14b are best characterized as being homo-compressive layers.

Referring now to FIG. 2A, the grain structure of an optical element of zinc sulfide having a compressive coating of zinc sulfide is shown. The coating 14a is over the upper portion of the photomicrograph denoted by 14a, whereas the base is on the lower portion of the photomicrograph and is denoted by 12. As shown in FIG. 2A, the grain structure of coating 14a is relatively small, on the order of less than 1 micron. Further, the grain structure is columnar, that is the grains are elongated in the direction of growth. This is due to the relatively high nucleation rate on the surface of base 12 as the coating is deposited by the r.f. magnetron sputtering technique. The base 12 here of Multispectral ® ZnS is provided by a chemical vapor disposition technique and has generally a relatively large grain structure. Typical grain sizes for the base are 20 to 200 microns. This is generally confirmed in FIG. 2A, which the grain structure depicted for base 12 is that of one single, large grain with no grain boundaries being evident over the approximately 25 μ wide cross-section sample. The coating meets the base in an interface region 13 best characterized as being somewhat undefined and disordered.

Figure 3:
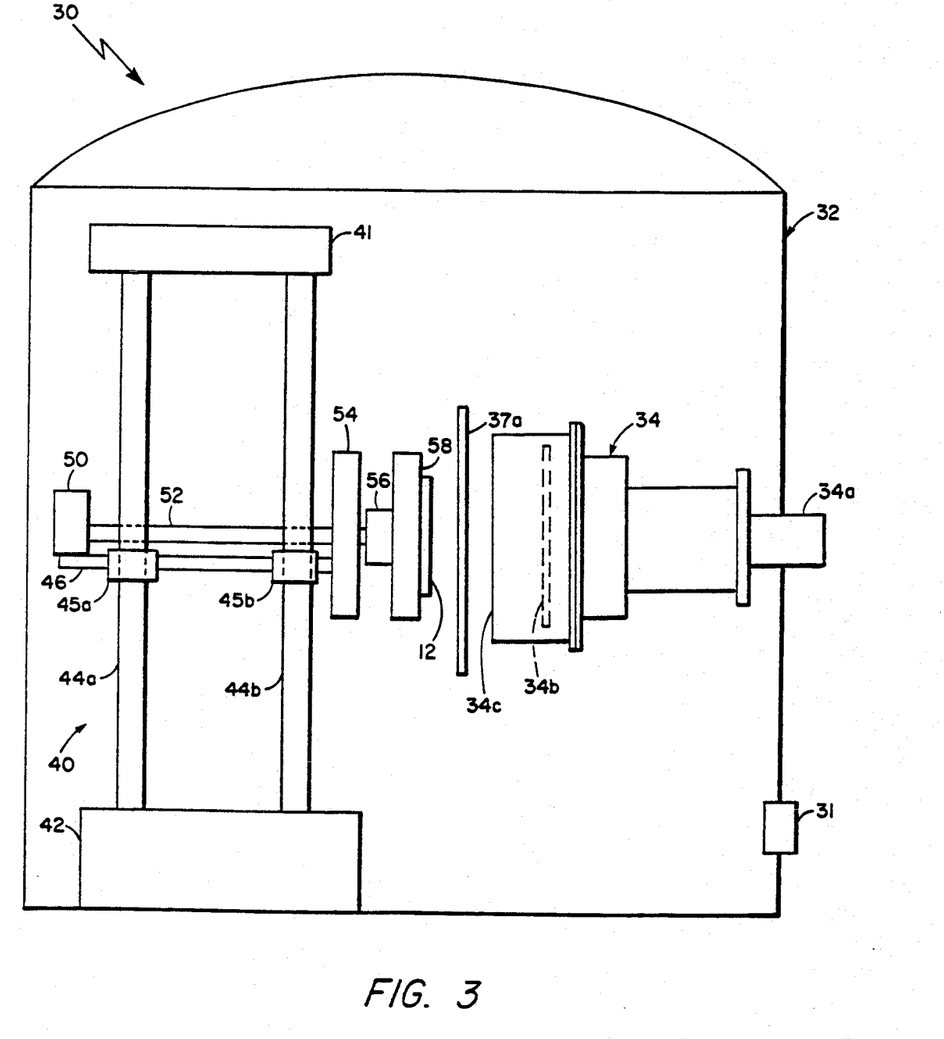
FIG. 3 is a schematic representation of a preferred deposition apparatus used to provide the coating layer over the element of FIG. 1.

Referring now to FIG. 3, an apparatus 30 for providing the homo-compressive coating layer 14a is shown to include a vessel 32, here a vacuum vessel 32, which may support a vacuum pressure of at least $10^{-5}$ torr typically comprised of stainless steel and an r.f. magnetron sputtering gun 34, as shown. The r.f. magnetron sputter gun, is here a 3" Magnetron Sputtering Gun from U.S. Gun Inc., Campbell, Calif. The gun 34a has an inlet 34a through which is fed cooling water and power (not shown) and an outlet 34c, from which during operation is provided sputtered species from a target 34b mounted within the r.f. magnetron sputtering gun 34. Here target 34b is the base material of base 12.

The apparatus 30 is shown to further include a shutter 37a disposed front of the exit port 34c of the magnetron sputtering gun 34. Such shutter 37a is in a normally closed position except during deposition of material onto base 12.

The apparatus further includes a base rotation apparatus 40, including a base 42 for support and three supports 44a, 44b, (one not shown) which are mounted between the base 42 and a cap 41, and which in combination with the base 42 provides rigid structural integrity to the apparatus 40. The apparatus 40 further includes a table or platform 46 having stops 45a, 45b mounted therethrough. The supports are disposed through the stops 45a, 45b, and such stops are used to hold the platform in position against the supports 44a, 44b, as shown.

Disposed on platform 46 is a motor 50 having a shaft 52, which is disposed through a conventional hotplate heater 54 and a coupling 56. Coupling 56 is mounted to the rear of a base holder 58 and permits base holder 58 to rotate clockwise or counterclockwise in accordance with the rotation of shaft 52.

Thus, apparatus 40 permits the base 12 to be rotated clockwise or counterclockwise in accordance with the rotation of motor 50. The vessel 32 further includes a port 31 through said vessel 32, as shown, used to evacuate the vessel and to backfill the vessel with an inert gas, such as argon, which is used during the sputtering operation, as will now be described.

In order to provide layer 14a, over the base 12, here with said base 12 being, for example zinc sulfide, layer 14a would also be zinc sulfide. To start a deposition the interior of vessel 32 is first evacuated to a vacuum of about $1 \times 10^{-5}$ torr up to $10^{-7}$ torr. Then the vessel 32 is backfilled with Ar to a pressure of about 1 to 200 mtorr. Argon is here used to bombard target 34b, sputtering off ZnS. The base heater 54 is activated to raise the temperature of base 12 to a predetermined temperature generally above the boiling point of water, or 100° C. to drive water from the base 12. The motor 50 is activated to enable the base 12 to rotate generally at slow speeds of 20 rpm, in here a clockwise direction opposite the exit port 34c of the r.f. magnetron sputtering source 34. R.F. magnetron sputtering source 34 is energized and coolant water (not shown) is directed through the source 34 via outlet 34a. The shutter 37a is in a normally closed position and zinc sulfide is permitted to be deposited on the shutter 37a. After a predetermined period of time to getter impurities which may be contained in the vessel 32, shutter 37a is opened thereby permitting zinc sulfide sputtered from the target 34b to deposit onto base 12, while the base 12 is rotated in position 58. This provides the coating layer 14.

Preferred deposition parameters for depositing layer 14 are set forth below:

| Typical thick ZnS deposition runs | |
|---|---|
| power | 200 watts RF |
| deposition rate | 4.7 Å/sec. |

-continued

| Typical thick ZnS deposition runs | |
|---|---|
| pressure | 3.8 μm |
| argon flow | 20. sccm |
| temperature | >150° C. |

In particular, samples of zinc sulfide, here RAYTRAN®, Multispectral Grade®, zinc sulfide from Raytheon Company were provided with coating 14a in accordance with the discussion of FIGS. 1-3. The standard mechanical properties of standard grade RAYTRAN® and Multispectral® grade RAYTRAN® zinc sulfide are shown in Table 2.

TABLE 2

| PROPERTY | UNCOATED STD. | UNCOATED MULTI-SPECTRAL | COATED MULTI-SPECTRAL |
|---|---|---|---|
| FRACTURE STRENGTH (PSI) | 15,000 | 10,000 | 13,200 |
| KNOOP HARDNESS (KG/MM$^2$) (50 g load) | 250 | 160 | 385 |
| DENSITY (G/CM$^3$) | 4,089 | 4,089 | 4,089 |
| THERMAL EXPANSION COEF. (°C$^{-1}$) (RT-500° C.) | 7.85 × 10$^{-6}$ | 7.85 × 10$^{-6}$ | 7.85 × 10$^{-6}$ |
| ELASTIC MODULUS (PSI) | 10.8 × 10$^6$ | 12.7 × 10$^6$ | *12.7 × 10$^6$ |
| POISSON'S RATIO | 0.27 | 0.32 | *0.32 |
| GRAIN SIZE (μm) BASE | 2-6 | 20-200 | 20-200 |
| GRAIN SIZE (μm) COATING | — | — | <1 |

*estimates

Table 2 also shows corresponding mechanical properties for Multispectral® zinc sulfide coated with a 8.5μ thick layer 14a of zinc sulfide in accordance with the present invention. A comparison of the mechanical properties of the uncoated Multispectral® zinc sulfide and coated Multispectral® zinc sulfide shows an increase in the fracture strength of approximately 32%, and an increase in Knoop hardness of 240% over Multispectral®. Moreover, while the fracture strength of the coating sample is less than that of the standard RAYTRAN®, the Knoop hardness is 54% greater for the coating Multispectral® ZnS over standard uncoated ZnS.

Figure 4:
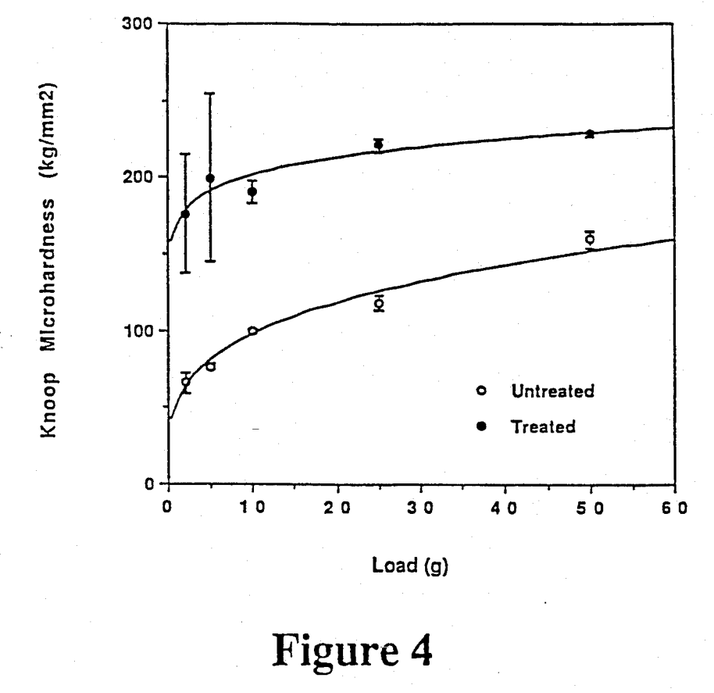
FIG. 4 is a plot of Knoop microhardness numbers (kg mm$^2$) vs. load (g) for samples of zinc sulfide untreated, and treated in accordance with the present invention.

Referring now to FIG. 4, a plot of Knoop hardness vs. load for a sample of Multispectral Grade® zinc sulfide coated with a 3.0μ thick layer in accordance with the present invention (curve 62) and uncoated Multispectral Grade® zinc sulfide (curve 64) are shown as a function of indenter load. Curves 62 and 64, which are best fit curves to the actual data points indicated, show an average increase in Knoop hardness of approximately 40% for the zinc sulfide samples having the coating layer 14a in accordance with the present invention.

Figure 5:
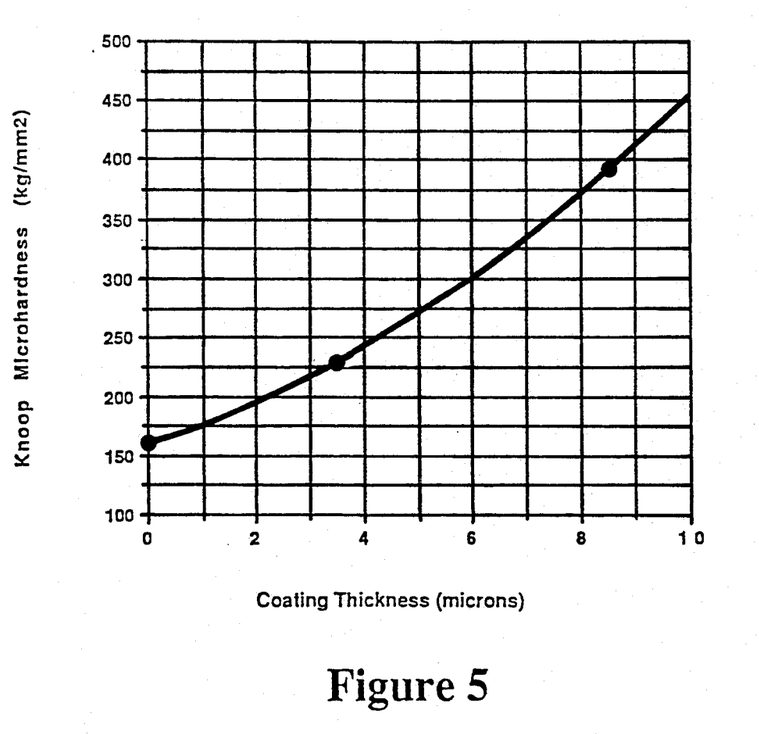
FIG. 5 is a plot of Knoop microhardness numbers kg/mm$^2$) vs. coating thickness for samples of zinc sulfide in accordance with the present invention.

Referring now to FIG. 5, a plot 66 of Knoop microhardness vs. coating thickness is also shown. As shown, and would thus now be apparent to one of skill in the art, the microhardness of the layer increases as a function of increasing thickness of the coating layer at fixed indenter load of here 50 gm. Thus, at a coating thickness of approximately 8.5μm, the microhardness of the Multispectral Grade® zinc sulfide element was 390 kg/mm$^2$.

Accordingly, the surface hardness of the Multispectral® zinc sulfide increases as a function of increasing coating thickness. Thus, the coated zinc sulfide sample will increase the resistance of a zinc sulfide optical element to damage caused by exposure to adverse environments, such as droplet impact.

Figure 6:
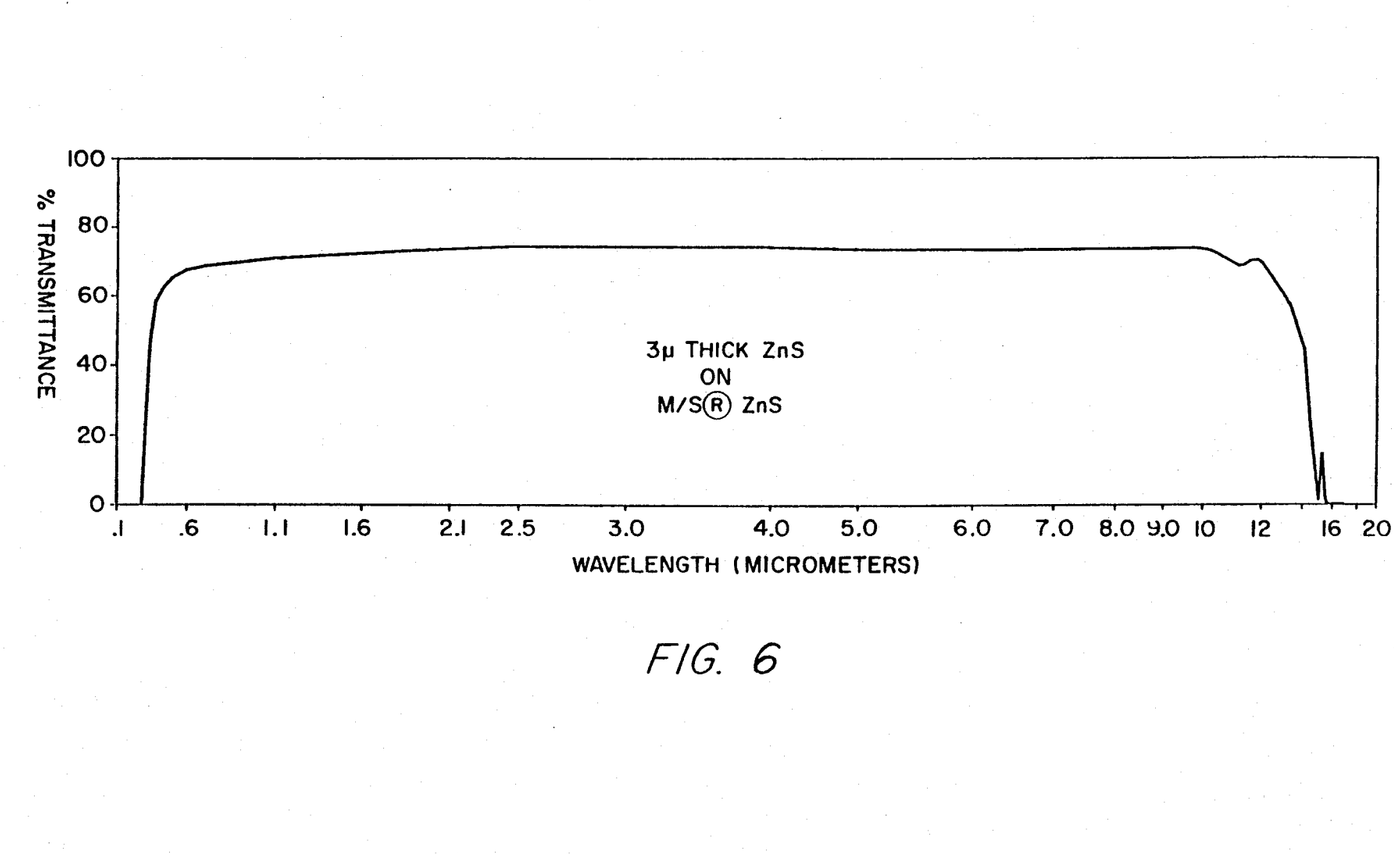
FIG. 6 is a graph of % transmittance vs. wavelength (microns) and wavenumber (cm$^{-1}$) for a zinc sulfide window having a coating in accordance with the present invention.

Referring now to FIG. 6, the percent transmittance as a function of wavelength and wavenumber for a Multispectral® zinc sulfide window having a zinc sulfide coating layer 14a, 3.0 μm thick over one surface thereof is shown. The percent transmittance of the coated Multispectral® zinc sulfide sample is substantially the same as a Multispectral® zinc sulfide window of the same thickness, but without the coating layer, and thus although the coating layer improves the mechanical properties of the zinc sulfide, the coating layer does not adversely affect in any signficant manner the optical properties of the Hultispectral® zinc sulfide optical element.

Typically the intrinsic compressive stress of the zinc sulfide base layer is zero since this material is generally deposited under equilibrium conditions which permits the deposited layer to freely expand or contract during growth.

The compressive stress intrinsic in the homo-compressive layer 14 is typically between 10$^8$ to 10$^{10}$ dynes/cm$^2$. The general range for a ZnS layer 14 is about 6.5×10$^9$ to 8.5×10$^9$ dynes/cm$^2$. A compressive stress much lower than the broad range mentioned above will provide a concomitantly lower degree of improvement, whereas a compressive stress much higher than that mentioned above may result in the deposited layer peeling off the base 12.

Having described preferred embodiments of the invention, it will now become apparent to one of skill in the art that other embodiments incorporating their concepts may be used. For example, although the above discussion was focused on 8-12μ materials homo-compressive layers would also strengthen other ceramic and glassy materials such as 3-5μ materials (eg. Y$_2$O$_3$ etc.). Moreover, layer 14a deposited over standard grade RAYTRAN® ZnS or equivalent will provide an improvement in hardness and may also improve flexural strength. It is felt, therefore, that these embodiments should not be limited to disclosed embodiments, but rather should be limited only by the spirit and scope of the appended claims.

What is claimed is:
1. An optical element comprising:
   a base comprising a material having a first intrinsic compressive stress characteristic and a predetermined optical transmittance over at least a portion of an optical range of about 2 microns to 30 microns; and
   a coating layer of the material of said base disposed on said base with said coating layer having a second intrinsic compressive stress characteristic having a value greater than a value of said first intrinsic compressive stress characteristic of the material of the base.
2. The optical element, as recited in claim 1, wherein the optical element has a grain structure with a first portion of said grain structure corresponding to that of the base, being substantially uniform and having a first grain size characteristic, a second portion of the grain structure corresponding to that of the coating having a second grain size characteristic smaller in size compared to said first grain size characteristic of the base and interfacing with that of the base in a region of high grain boundary mismatch.

3. The optical element, as recited in claim 2, wherein the material is selected from the group consisting of zinc sulfide, zinc selenide, gallium arsenide, gallium phosphide, mercury cadmium, cadmium tellurium, and a ternary sulfide.

4. The optical element, as recited in claim 2, wherein the material is selected form the group consisting of zinc sulfide and zinc selenide.

5. The optical element, as recited in claim 1, wherein the coating has a physical thickness in the range of 1 micron to 8 microns.

6. An optical element, comprising:
a base having a thickness of at least about 0.05 inches, of a material selected from the group consisting of zinc sulfide and zinc selenide having a first predetermined optical transmissivity over at last the optical range of about 8 microns to 12 microns; and
a coating layer disposed on said base, of the material of said base, and having a thickness in the range of about 1 micron to 8 microns, with said optical element having a grain structure with a first portion of said grain structure of the element corresponding to that of the base, being substantially uniform and having a first grain size characteristic, and a second portion of the grain structure of the element corresponding to that of the coating, having a second grain size characteristic smaller than said first grain size characteristic of the base and interfacing with that of the base in a region of high grain boundary mismatch.

7. The optical element of claim 6, wherein said coating layer has an intrinsic compressive stress greater than that of said base in the range of $10^8$ to $10^{10}$ dynes/cm$^2$.

8. The optical element of claim 6, wherein said material is zinc sulfide and said optical element has a Knoop microhardness characteristic measured on the coated surface thereof in the range of at least 176 to 340 kg/mm$^2$, for a 50 g load.

9. The optical element of claim 7, wherein said element has a first flexural strength characteristic prior to the coating and after the coating the element has a second flexural strength characteristic greater than said first flexural strength characteristic.

10. The optical element of claim 9, wherein said element has a coating with a thickness of 8.5 $\mu$ and a flexural strength characteristic of about 13,200 (psi).

11. The optical element of claim 6, wherein the grain size of the coating is less than about 1 micron.

12. The optical element of claim 8, wherein the grain size of the coating is on the order of about 1 micron or less.

13. The optical element of claim 10, wherein the grain size of the coating is on the order of about 1 micron or less.

* * * * *